United States Patent
Greenfield et al.

(10) Patent No.: US 10,488,870 B2
(45) Date of Patent: Nov. 26, 2019

(54) GUST ALLEVIATING CONTROL FOR A COAXIAL ROTARY WING AIRCRAFT

(71) Applicant: Sikorsky Aircraft Corporation, Stratford, CT (US)

(72) Inventors: Aaron L. Greenfield, Shelton, CT (US); Kenneth S. Wittmer, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 268 days.

(21) Appl. No.: 15/561,807

(22) PCT Filed: Feb. 12, 2016

(86) PCT No.: PCT/US2016/017759
§ 371 (c)(1),
(2) Date: Sep. 26, 2017

(87) PCT Pub. No.: WO2016/167865
PCT Pub. Date: Oct. 20, 2016

(65) Prior Publication Data
US 2018/0113478 A1    Apr. 26, 2018

Related U.S. Application Data

(60) Provisional application No. 62/148,331, filed on Apr. 16, 2015.

(51) Int. Cl.
*G05D 1/06*    (2006.01)
*B64C 13/16*    (2006.01)
(Continued)

(52) U.S. Cl.
CPC .......... *G05D 1/0638* (2013.01); *B64C 13/16* (2013.01); *B64C 27/10* (2013.01); *B64C 27/57* (2013.01); *G05D 1/0858* (2013.01)

(58) Field of Classification Search
CPC .... G05D 1/0638; G05D 1/0858; B64C 27/10; B64C 27/57; B64C 13/16; Y02T 50/44
See application file for complete search history.

(56) References Cited

U.S. PATENT DOCUMENTS 3,584,814 A    6/1971    Murphy
4,213,584 A    7/1980    Tefft et al.
(Continued)

FOREIGN PATENT DOCUMENTS

WO    2014045276 A1    3/2014

OTHER PUBLICATIONS

Notification of Transmittal of the International Search Report for International Application No. PCT/US2016/017759 dated Apr. 18, 2016; dated Apr. 29, 2016; 9 pages.
(Continued)

*Primary Examiner* — Hunter B Lonsberry
*Assistant Examiner* — Donald J Wallace
(74) *Attorney, Agent, or Firm* — Cantor Colburn LLP

(57) ABSTRACT

One aspect is a flight control system for a coaxial rotary wing aircraft including a main rotor system and an active elevator. The flight control system includes a flight control computer with processing circuitry that executes control logic. The control logic includes a gust detector that produces a gust error indicative of a wind gust encountered by the coaxial rotary wing aircraft. The control logic also includes a gust alleviation control that reduces lift on the main rotor system with collective, based on the gust error, and mixes a collective command to a main rotor cyclic and a differential cyclic to reduce an aircraft pitch response and a lift-offset change. The gust alleviation control also reduces a main rotor pitching moment with the main rotor cyclic,
(Continued)

based on the gust error, and mixes a main rotor cyclic command to the active elevator to reduce the aircraft pitch response.

15 Claims, 8 Drawing Sheets

(51) Int. Cl.
  B64C 27/10 (2006.01)
  G05D 1/08 (2006.01)
  B64C 27/57 (2006.01)

(56) References Cited

U.S. PATENT DOCUMENTS

| | | |
|---|---|---|
| 4,930,988 A | 6/1990 | Griffith |
| 5,971,325 A | 10/1999 | Gold et al. |
| 6,092,007 A * | 7/2000 | Cotton ................ G05D 1/0204 244/181 |
| 6,648,269 B2 | 11/2003 | Gold et al. |
| 7,437,223 B2 | 10/2008 | Randazzo et al. |
| 8,000,847 B2 * | 8/2011 | Shue ................... G05D 1/0623 244/181 |
| 2004/0251383 A1 * | 12/2004 | McDonnell .......... B64C 27/615 244/82 |
| 2007/0221780 A1 | 9/2007 | Builta |
| 2009/0157239 A1 * | 6/2009 | Walton ................... B64C 13/16 701/6 |
| 2011/0057071 A1 | 3/2011 | Sahasrabudhe et al. |
| 2015/0028162 A1 * | 1/2015 | Wildschek .............. B64C 13/16 244/76 C |
| 2015/0057844 A1 * | 2/2015 | Callou ................ G05D 1/0204 701/3 |
| 2015/0314855 A1 * | 11/2015 | Luszcz ................... B64C 27/72 701/3 |
| 2016/0357191 A1 * | 12/2016 | Abdel-Motagaly ......................... G05D 1/0066 |
| 2018/0265190 A1 * | 9/2018 | Fortenbaugh ........... B64C 13/18 |

OTHER PUBLICATIONS

Written Opinion of the international Searching Authority for International Application No. PCT/US2016/017759 dated Apr. 18, 2016; dated Apr. 29, 2016; 6 pages.

* cited by examiner

GUST ALLEVIATING CONTROL FOR A COAXIAL ROTARY WING AIRCRAFT

CROSS REFERENCE TO RELATED APPLICATIONS

This application is a National Stage application of PCT/US2016/017759, filed Feb. 12, 2016, which claims the benefit of U.S. Provisional Patent Application No. 62/148,331 filed Apr. 16, 2015, both of which are incorporated by reference in their entirety herein.

STATEMENT REGARDING FEDERALLY SPONSORED RESEARCH OR DEVELOPMENT

This invention was made with government support under contract number W911W6-13-2-0003 awarded by the United States Government. The government has certain rights in the invention.

BACKGROUND

Embodiments of the invention generally relate to a control system of a rotary wing aircraft, and more particularly, to a gust alleviating control for a coaxial rotary wing aircraft.

Rigid dual rotor helicopters are those with two coaxial, counter-rotating rotors. Each rotor is typically controlled by a respective independent swash plate and can be commanded with both differential and ganged collective and cyclic controls. Differential controls move the swashplates in opposite directions, while ganged controls move the swashplates in unison. Rigid coaxial rotor helicopters must be designed with sufficient rotor spacing to ensure that the rotor blade tips never touch during any maneuver in the flight envelope. As forward flight speed increases, the advancing portion of the rotor produces more lift than the retreating portion because the relative wind speed is higher. This phenomenon is lift offset, the measure of where the center of lift is generated on the two rotors. The use of collective control also changes lift offset with forward airspeed. Lift offset produces opposing roll moments, thus the rotor roll moments acting on each rotor are substantially opposing. These roll moments and lift offset reduce tip clearance between the rotor blades of the coaxial rotors.

High speed operation of a coaxial rotor helicopter in a gusty environment can also adversely affect tip clearance, because tip clearance generally decreases with speed and load factor. The dynamic nature of wind gusts presents difficulties in manually controlled compensation, as wind gusts can vary rapidly. Furthermore, loads induced by heavy wind gusts can also produce a sizable rotor hub moment. One approach to handling increased rotor hub loads is an increase in rotor hub size during system development. However, rotor hub size increases also result in increased rotor hub weight, which is a notable contributor to overall aircraft weight and thus undesirable.

BRIEF DESCRIPTION

According to one embodiment, a flight control system for a coaxial rotary wing aircraft including a main rotor system and an active elevator is provided. The flight control system includes a flight control computer that interfaces with the main rotor system and the active elevator. The flight control computer includes processing circuitry that executes control logic. The control logic includes a gust detector that produces a gust error indicative of a wind gust encountered by the coaxial rotary wing aircraft. The control logic also includes a gust alleviation control that reduces lift on the main rotor system with collective, based on the gust error, and mixes a collective command to a main rotor cyclic and a differential cyclic to reduce an aircraft pitch response and a lift-offset change. The gust alleviation control also reduces a main rotor pitching moment with the main rotor cyclic, based on the gust error, and mixes a main rotor cyclic command to the active elevator to reduce the aircraft pitch response.

In addition to one or more of the features described above or below, or as an alternative, further embodiments could include where the gust detector includes a pitch rate model that maps a pitch rate command into either an expected load factor or an expected angle-of-attack.

In addition to one or more of the features described above or below, or as an alternative, further embodiments could include where the gust detector compares either the expected load factor or the expected angle-of-attack to a sensed load factor or an observed angle-of-attack to determine an aircraft disturbance.

In addition to one or more of the features described above or below, or as an alternative, further embodiments could include where the gust detector applies a dead-band to the aircraft disturbance and produces the gust error.

In addition to one or more of the features described above or below, or as an alternative, further embodiments could include where the gust alleviation control further includes collective-based dynamic shaping of the gust error to quicken and scale the gust error as a collective-control quickened gust error.

In addition to one or more of the features described above or below, or as an alternative, further embodiments could include where the gust alleviation control applies a limiter to the collective-control quickened gust error as a collective-control limited quickened gust error to restrict authority of the collective control response.

In addition to one or more of the features described above or below, or as an alternative, further embodiments could include where the gust alleviation control sums the collective-control limited quickened gust error with a pilot collective to produce an augmented pilot collective command.

In addition to one or more of the features described above or below, or as an alternative, further embodiments could include where the gust alleviation control further includes a mixer that outputs a ganged pitch cyclic command, the collective command, and a differential lateral cyclic command to reduce the aircraft pitch response and a lift offset response to the augmented pilot collective command.

In addition to one or more of the features described above or below, or as an alternative, further embodiments could include where the gust alleviation control further includes elevator-control dynamic shaping of the gust error to quicken and scale the gust error for elevator control as an elevator-control quickened gust error.

In addition to one or more of the features described above or below, or as an alternative, further embodiments could include where the gust alleviation control applies a limiter to the elevator-control quickened gust error as an elevator-control limited quickened gust error to restrict authority of the elevator control response.

In addition to one or more of the features described above or below, or as an alternative, further embodiments could include a delay element that transforms the elevator-control limited quickened gust error into an elevator command.

In addition to one or more of the features described above or below, or as an alternative, further embodiments could include a transformed elevator command filter that produces the main rotor cyclic command based on the elevator command in order to reduce the aircraft pitch response.

According to another embodiment, a method of gust alleviation on a coaxial rotary wing aircraft that includes a main rotor system and active elevator is provided. A gust detector produces a gust error indicative of a wind gust encountered by the coaxial rotary wing aircraft. A gust alleviation control reduces lift on the main rotor system with collective based on the gust error. A collective command is mixed to a main rotor cyclic and a differential cyclic to reduce an aircraft pitch response and a lift-offset change. A main rotor pitching moment is reduced with the main rotor cyclic based on the gust error. A main rotor cyclic command is mixed to the active elevator to reduce the aircraft pitch response.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Exemplary embodiments provide gust alleviating control for a coaxial rotary wing aircraft which includes an active elevator. In exemplary embodiments, gust alleviating control methods can increase tip clearance between a pair of coaxial rotors of a coaxial rotor system of the coaxial rotary wing aircraft and handle loads at high speed by taking control actions in response to an unexpected load factor or angle-of-attack. An onboard control system can sense wind gust conditions resulting in high load factor at high speeds and control both the coaxial rotor system and auxiliary pitch control surfaces, such as an active elevator, to reduce the impact to tip clearance and loads. The control system may lessen constraints on the coaxial rotor system, which can be used to improve aircraft weight and operational envelope.

Figure 1:
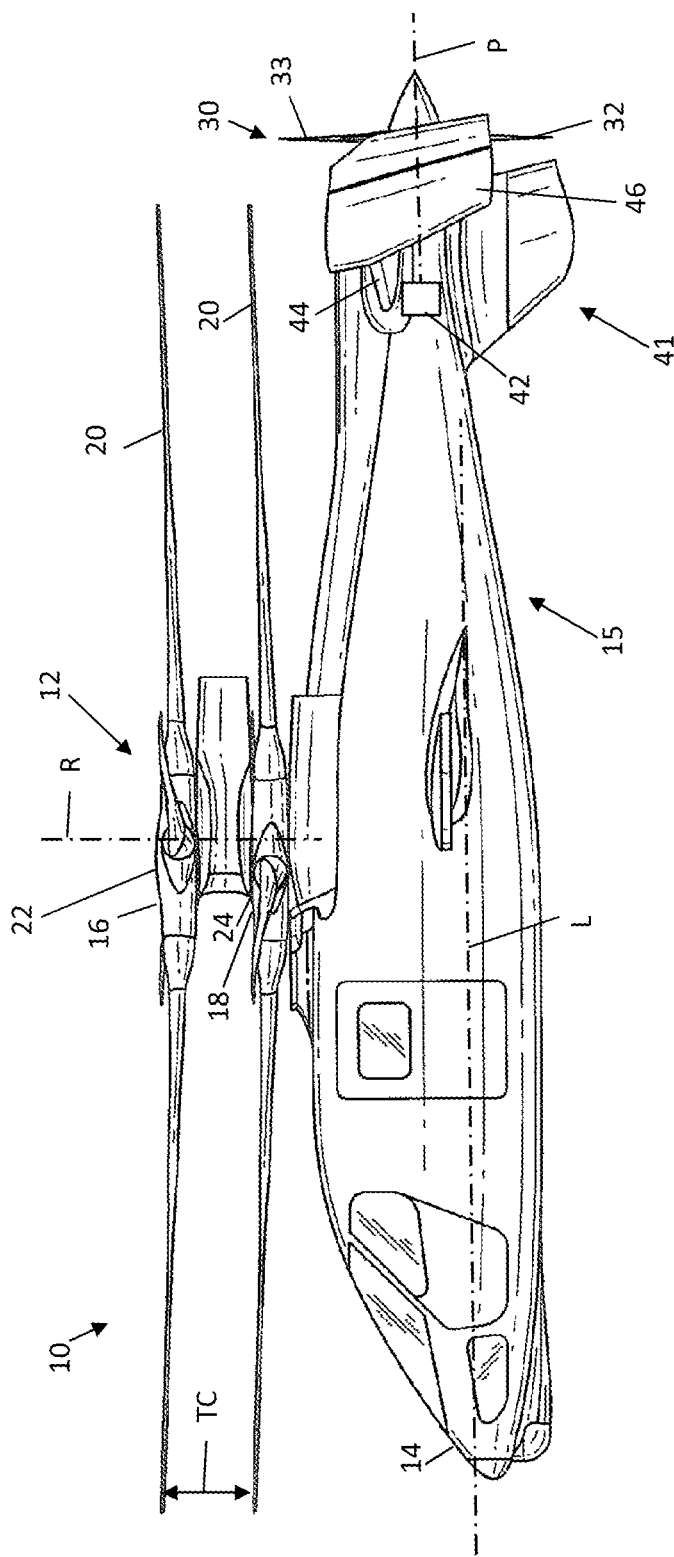
FIG. 1 is a general side view of an exemplary rotary wing aircraft in accordance with embodiments.
Figure 2:
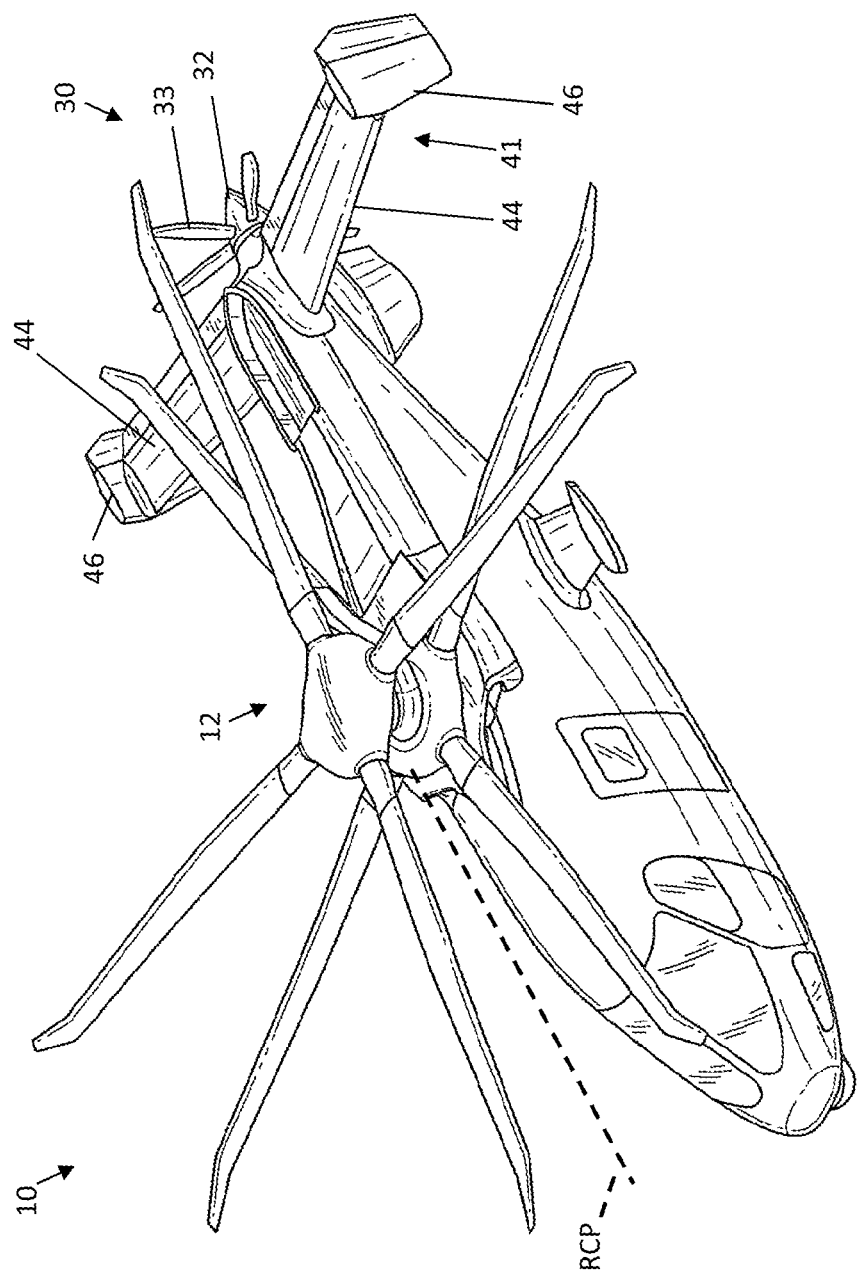
FIG. 2 is a perspective view of the exemplary rotary wing aircraft of FIG. 1.

FIGS. 1 and 2 illustrate an exemplary vertical takeoff and landing (VTOL) high-speed coaxial rotary wing aircraft 10 having a dual, contra-rotating main rotor system 12, which rotates about a rotor axis of rotation R. The aircraft 10 includes an airframe 14 which supports the dual, contra-rotating, coaxial main rotor system 12 as well as a translational thrust system 30 which provides translational thrust generally parallel to an aircraft longitudinal axis L. A fuselage transition section 15 of the aircraft 10 is disposed between the main rotor system 12 and the translational thrust system 30.

The main rotor system 12 includes an upper rotor system 16 and a lower rotor system 18 as dual contra-rotating main rotors in a coaxial configuration. A plurality of rotor blade assemblies 20 are mounted to a rotor hub 22, 24 of each rotor system 16, 18, respectively having a tip clearance TC between the rotor blade assemblies 20 of the rotor system 16, 18. The tip clearance TC indicates a clearance at a rotor crossing point (RCP) of a rotor blade assembly 20 of the upper rotor system 16 relative to a rotor blade assembly 20 of the lower rotor system 18 where the tip clearance TC is at a minimum. The translational thrust system 30 may be any propeller system including, but not limited to a pusher propeller, a tractor propeller, a nacelle mounted propeller, etc. In the example of FIGS. 1-2, the translational thrust system 30 includes an auxiliary propulsor 32. In an embodiment, the auxiliary propulsor 32 is a pusher propeller system with a propeller rotational axis P oriented substantially horizontal and parallel to the aircraft longitudinal axis L to provide thrust for high speed flight. Although a particular rotary wing aircraft configuration is illustrated and described in the disclosed non-limiting embodiment, other configurations and/or machines with rotor systems are within the scope of the present disclosure.

In the example of FIGS. 1 and 2, the auxiliary propulsor 32 includes a plurality of propeller blades 33 and is positioned at a tail section 41 of the aircraft 10. The tail section 41 includes active elevators 44 and active rudders 46 as controllable surfaces, as best seen in FIG. 2. Exemplary embodiments include an elevator control system 42 (illustrated schematically in FIG. 1) configured to control the active elevators 44. While only a limited number of elements and systems of the aircraft 10 are described in reference to FIGS. 1 and 2, it will be understood that a number of other control systems and known aircraft elements included in the aircraft 10 are not described in detail for ease of explanation.

Figure 3:
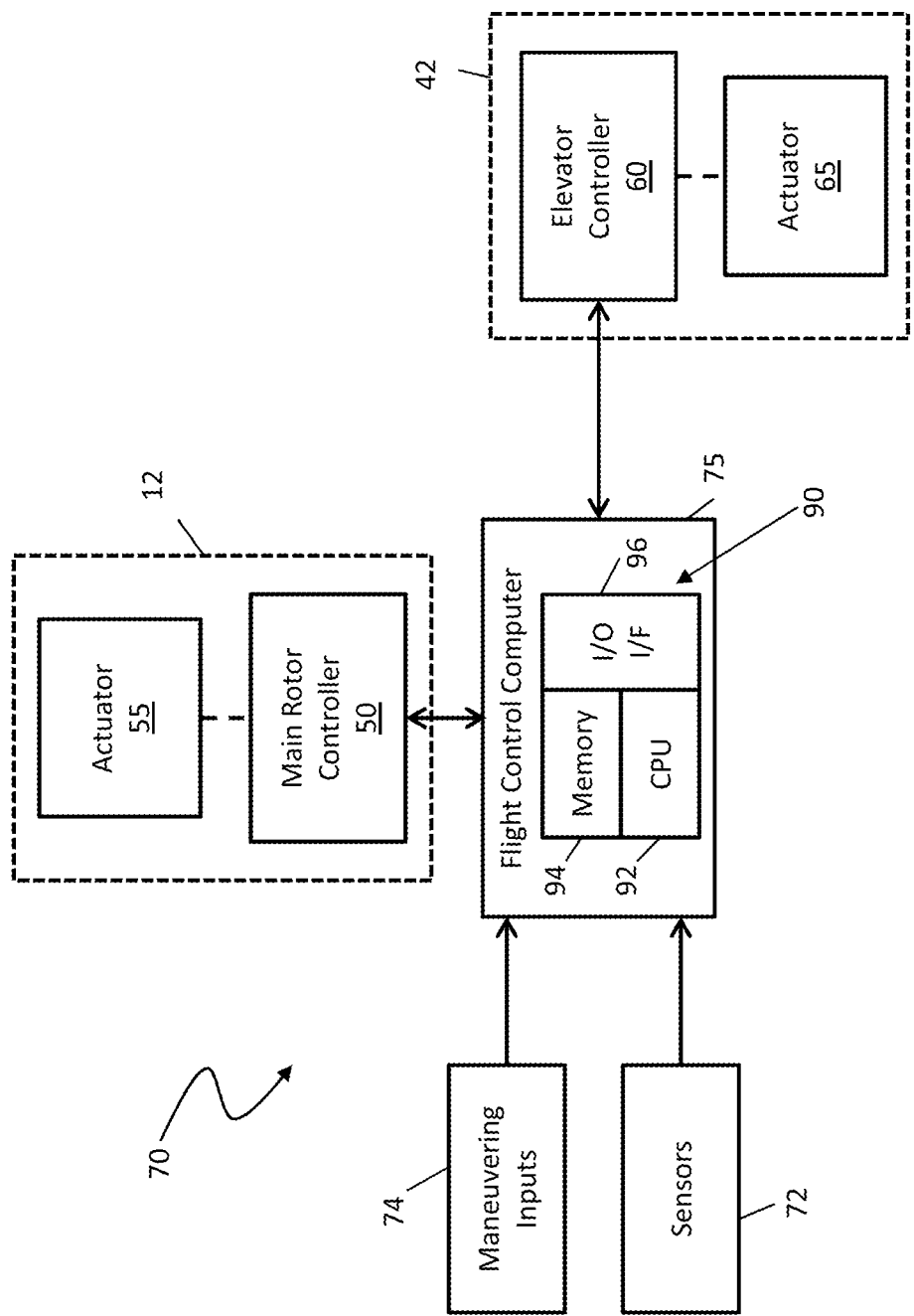
FIG. 3 is a schematic diagram of a flight control system of a rotary wing aircraft according to an embodiment.

Portions of the aircraft 10, such as the main rotor system 12 and the elevator control system 42 for example, are controlled by a flight control system 70 illustrated in FIG. 3. In one embodiment, the flight control system 70 is a fly-by-wire (FBW) control system. In a FBW control system, there is no direct mechanical coupling between a pilot's controls and movable components such as rotor blade assemblies 20 or active elevators 44 of the aircraft 10 of FIGS. 1 and 2. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive maneuvering inputs 74 as control commands from various sources. For instance, the maneuvering inputs 74 can be pilot inputs, auto-pilot inputs, navigation system based inputs, or any control inputs from one or more outer control loops. In response to inputs from the sensors 72 and maneuvering inputs 74, the FCC 75 transmits signals to various subsystems of the aircraft 10, such as the main rotor system 12 and the elevator control system 42.

The main rotor system 12 can include a main rotor controller 50 configured to receive commands from the FCC 75 to control one or more actuators 55, such as a mechanical-hydraulic or electric actuator, for the rotor blade assemblies 20 of FIGS. 1 and 2. In an embodiment, maneuvering inputs 74 including cyclic, collective, pitch rate, and throttle commands may result in the main rotor controller 50 driving the one or more actuators 55 to adjust one or more swashplate assemblies (not depicted) for pitch control of the rotor blade assemblies 20 of FIGS. 1 and 2. Alternatively, pitch control can be performed without a swashplate assembly.

The elevator control system 42 can include an elevator controller 60 configured to receive commands from the FCC 75 to control one or more actuators 65, such as a mechanical-hydraulic or electric actuator, for the active elevator 44 of FIGS. 1 and 2. In an embodiment, maneuvering inputs 74 include an elevator pitch rate command for the elevator controller 60 to drive the one or more actuator 65 for pitch control of the active elevators 44 of FIGS. 1 and 2.

Rather than simply passing maneuvering inputs 74 through to the controllers 50 and 60, the FCC 75 includes a processing system 90 that applies models and control laws to augment commands based on aircraft state data. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, maneuvering inputs 74, and other sources (not depicted) and communicate with the main rotor controller 50, the elevator controller 60, and other subsystems (not depicted).

Figure 4:
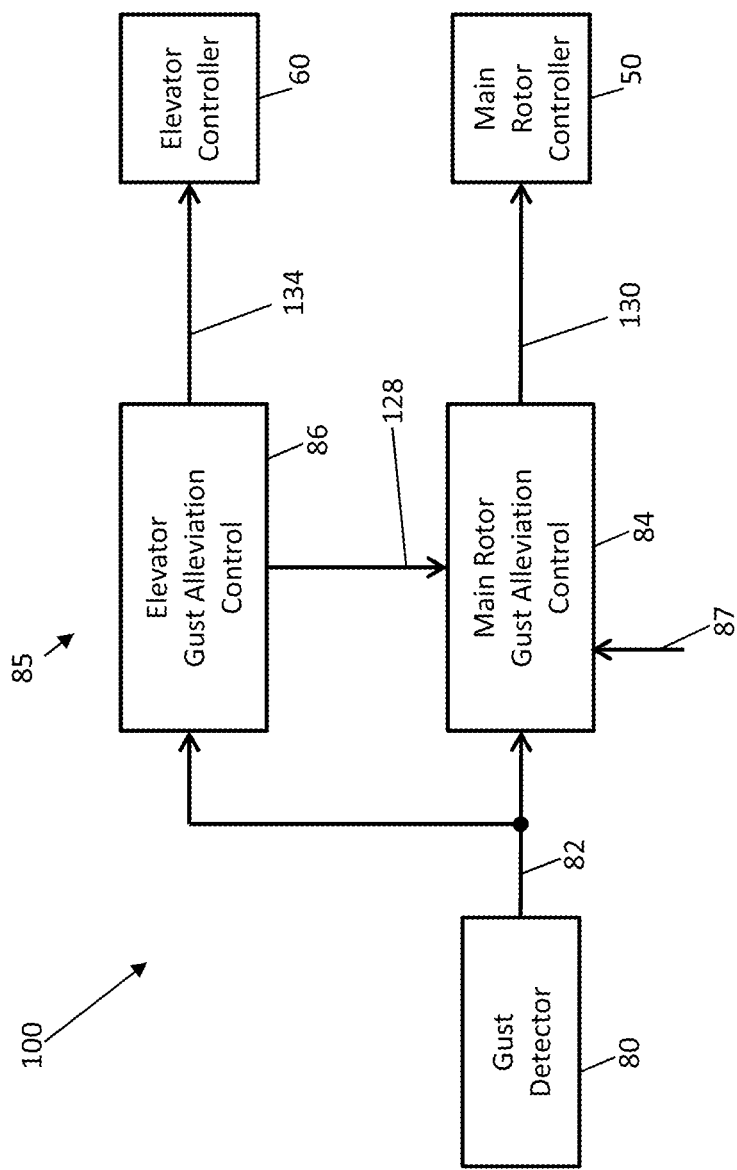
FIG. 4 is a schematic diagram of control logic in a flight control computer of a rotary wing aircraft according to an embodiment.

FIG. 4 depicts a portion of control logic 100 in the FCC 75 and is described with continued reference to FIGS. 1-3. The control logic 100 may be embodied as executable instructions in the memory 94 of FIG. 3, where the processing circuitry 92 of FIG. 3 is configured to read and execute the control logic 100. The control logic 100 depicted in FIG. 4 is related to gust alleviation aspects of the FCC 75, and it will be understood that other control functions known in the art can also be implemented in the FCC 75. In the example of FIG. 4, the control logic 100 includes a gust detector 80 that produces a gust error 82 indicative of a wind gust encountered by the coaxial rotary wing aircraft 10 of FIG. 1. The control logic 100 also includes gust alleviation control 85 that may include a main rotor gust alleviation control 84 and/or an elevator gust alleviation control 86. Alternatively, either the main rotor gust alleviation control 84 or the elevator gust alleviation control 86 can be omitted or disabled.

The gust alleviation control 85 may augment a control input 87, such as a pilot collective command, based on the gust error 82 to produce an augmented command that reduces a hub load on the main rotor system 12 of FIG. 1, increases a tip clearance TC between one of the rotor blade assemblies 20 of the upper rotor system 16 and one of the rotor blade assemblies 20 of the lower rotor system 18 at a rotor crossing point RCP, and drives a controller of the coaxial rotary wing aircraft 10 responsive to the augmented command. In one embodiment, the elevator gust alleviation control 86 produces a main rotor pitch adjustment command 128 for a main rotor feed forward path that can be used by the main rotor gust alleviation control 84 in generating an augmented main rotor feed forward command 130 for the main rotor controller 50 based on the gust error 82. The elevator gust alleviation control 86 may also produce an augmented elevator command 134 for the elevator controller 60 based on the gust error 82.

Figure 5:
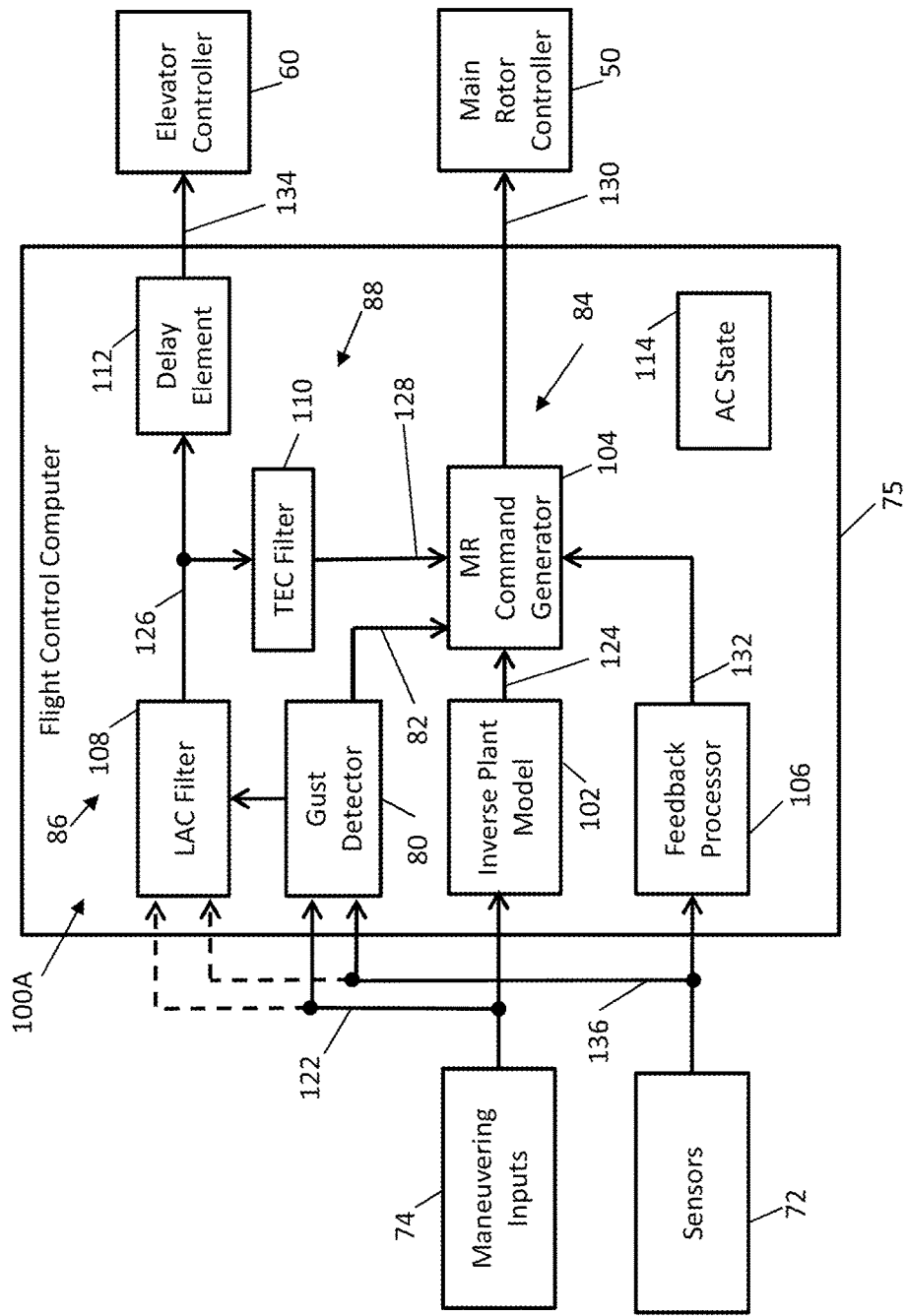
FIG. 5 is a schematic diagram of gust alleviation logic incorporated into a model following control system incorporating load alleviating functions according to an embodiment.

FIG. 5 is a schematic diagram of control logic 100A in FCC 75 of the coaxial rotary wing aircraft 10 of FIG. 1 according to an embodiment. The control logic 100A is an embodiment of the control logic 100 of FIG. 4. In the example of FIG. 5, the control logic 100A includes the gust detector 80, an inverse plant model 102, a main rotor command generator 104, a feedback processor 106, a load alleviation control (LAC) filter 108, a transformed elevator command (TEC) filter 110, and a delay element 112. An embodiment of the main rotor gust alleviation control 84 of FIG. 4 can be included in the main rotor command generator 104 of FIG. 5, and an embodiment of the elevator gust alleviation control 86 of FIG. 4 can be included in the combination of the LAC filter 108, TEC filter 110, and delay element 112 of FIG. 5.

The FCC 75 can also determine aircraft state values 114, which may include one or more flight regime parameters, such as airspeed, angle-of-attack, rotor speed, propeller speed, rotor blade pitch, propeller blade pitch, air density, altitude, and the like. The aircraft state values 114 can be used to make flight-regime based updates to various elements of the control logic 100A. For example, a table lookup operation and mapping of at least one flight regime parameter, such as airspeed, to filter coefficients and delay values can be used to configure the gust detector 80, the main rotor command generator 104, the LAC filter 108, the TEC filter 110, and/or the delay element 112.

In an exemplary embodiment, the maneuvering inputs 74 provide a pitch rate command 122. The pitch rate command 122 may be defined at an aircraft level and intended primarily for the main rotor system 12 during pitch transient maneuvering. The inverse plant model 102 can model various subsystems of the aircraft 10 of FIG. 1 to determine a response amount corresponding to the maneuvering inputs 74, such as the pitch rate command 122. The inverse plant model 102 may produce a main rotor feed forward command 124 based on the pitch rate command 122. In order to shift pitch moments between the main rotor system 12 and the tail section 41 and reduce loads on the main rotor system 12, the LAC filter 108 produces an elevator command 126 for the elevator control system 42 based on the pitch rate command 122. In the example of FIG. 4, the elevator command 126 is a feed forward command. The TEC filter 110 relates elevator commands to main rotor commands to maintain model following quality independent of the LAC filter 108. The TEC filter 110 produces a main rotor pitch adjustment command 128 based on the elevator command 126.

The main rotor command generator 104 generates an augmented main rotor feed forward command 130 for the main rotor system 12 based on the gust error 82, the main rotor feed forward command 124, and the main rotor pitch adjustment command 128. In an embodiment, the main rotor command generator 104 includes a mixer that generates the augmented main rotor feed forward command 130 for the main rotor system 12 based on a combination of the gust error 82, the main rotor feed forward command 124, the main rotor pitch adjustment command 128, and a main rotor feedback adjustment command 132 from the feedback processor 106, using for instance, a weighted summation. Additional inputs may also be considered by the main rotor command generator 104, such as other values from the maneuvering inputs 74. The augmented main rotor feed forward command 130 can be sent to the main rotor controller 50 of the main rotor system 12 to drive main rotor pitch changes. The feedback processor 106 converts feedback from a plurality of sensors 72 into the main rotor feedback adjustment command 132, using for example, sensed pitch rate and attitude relative to model values.

The main rotor system 12 may be slower to react to commands as compared to the elevator control system 42. Therefore, the delay element 112 can be included to delay the feed forward elevator command 126 to the elevator control system 42 such that a response of the elevator control system 42 to the elevator command 126 corresponds with a response of the main rotor system 12 to the augmented main rotor feed forward command 130. The output of the delay element 112 to the elevator controller 60 may be referred to as an augmented elevator command 134. As previously noted, the delay element 112 may be configurable based on at least one flight regime parameter, such as airspeed.

The LAC filter 108 can shape elevator commands to reduce loads applied to the main rotor system 12. The TEC filter 110 relates elevator commands to main rotor commands in a way that model following quality is preserved, independent of selected coefficients for the LAC filter 108. The elevator command 126 can be adjusted based on control saturation or prioritization for other uses. Any nonlinearity in the elevator command 126 is automatically compensated for via the TEC filter 110 producing the main rotor pitch adjustment command 128 for the main rotor feed forward path (i.e., contributes to the augmented main rotor feed forward command 130).

The TEC filter 110 may be defined as a ratio of an inverse plant for a model of a main rotor input to pitch rate relative to an inverse plant for a model of an elevator to pitch rate. The TEC filter 110 allows rapid reconfiguration between using and not using the LAC filter 108 or for failure/saturation of the elevator control system 42. The TEC filter 110 may also provide substantially close model following during LAC filter 108 transitions, such as fading-in or fading-out. The LAC filter 108 may be tuned by identifying a model from elevator input to pitch rate while maintaining a zero dynamic main rotor moment. Tuning can be performed over multiple flight regimes to establish a schedule of filter coefficients for the LAC filter 108. The LAC filter 108 and the TEC filter 110 may be scheduled based on flight conditions and need not be continuously active.

Although previously described in relation to the pitch rate command 122, the LAC filter 108 can alternatively produce the elevator command 126 as a feedback command based on a load related feedback signal 136 from sensors 72. One or more load related feedback signals 136 can be used to drive the elevator command 126, which can also impact performance at TEC filter 110 and delay element 112. Load related feedback signals 136 can include an aircraft angle-of-attack, a load factor, a main rotor hub moment, a tail load, or other feedback signals. Using such signals extends load reduction capability to disturbance loads on the aircraft 10 of FIG. 1, in addition to maneuvering loads. Steady-state, or trim loads, can also be minimized with the use of feedback control. Once a desired elevator deflection for load reduction is determined, an equivalent main rotor command is determined though the TEC filter 110 and delay element 112. This ensures that the load reducing feedback to the active elevators 44 of FIG. 2 has a minimal impact on pitch handling qualities and stability.

In summary, the gust detector 80 produces gust error 82 indicative of a wind gust encountered by the coaxial rotary wing aircraft 10. The gust alleviation control 85 reduces lift on the main rotor system 12 with collective, based on the gust error 12, and mixes a collective command to a main rotor cyclic and a differential cyclic to reduce an aircraft pitch response and a lift-offset change. The gust alleviation control 85 also reduces a main rotor pitching moment with the main rotor cyclic, based on the gust error 82, and mixes a main rotor cyclic command to the active elevator 44 to reduce the aircraft pitch response.

Figure 6:
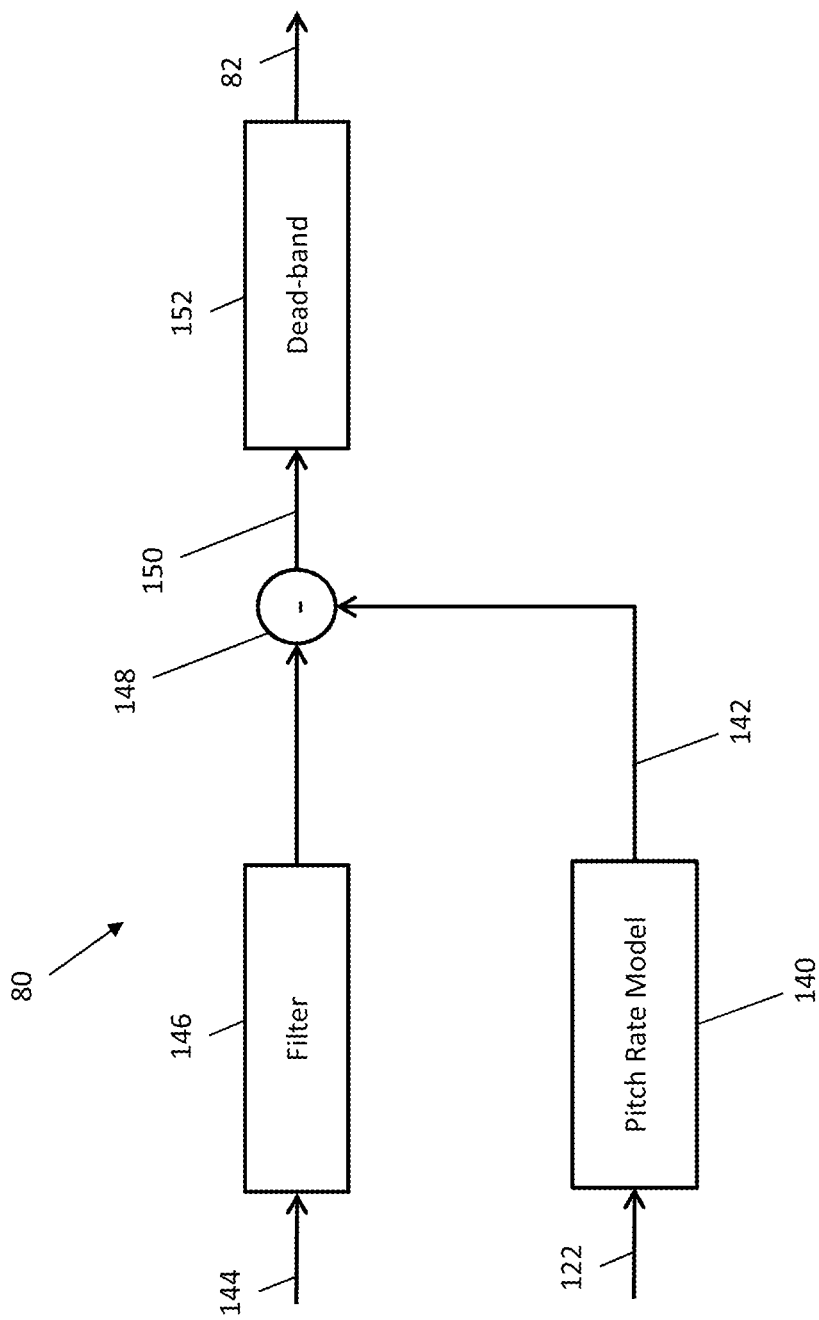
FIG. 6 is a schematic diagram of a gust detector according to an embodiment.

FIG. 6 is a schematic diagram of the gust detector 80 according to an embodiment. The gust detector 80 can include a pitch rate model 140 that maps the pitch rate command 122 into an expected value 142. The pitch rate model 140 may also be operable on airspeed and/or other aircraft state values 114 to produce the expected value 142. A gust-related input 144 may be filtered by a filter 146, e.g., a low-pass filter, and provided to a difference block 148 to produce an aircraft disturbance 150 to which a dead-band 152 can be applied to produce the gust error 82. The dead-band 152 may ensure that collective control action is only taken for large unexpected errors to avoid continuous automatic reductions in collective which could be considered a pilot nuisance. The expected value 142 and gust-related input 144 are scaled with the same engineering units to produce the aircraft disturbance 150. For example, the expected value 142 can be an expected load factor based on the pitch rate command 122, and the gust-related input 144 can be a sensed load factor. In this case, the difference block 148 determines the aircraft disturbance 150 as a load factor error between the sensed load factor and the expected load factor, and the dead-band 152 limits output of the gust error 82 based on the load factor error. As another example, the expected value 142 can be an expected angle-of-attack based on the pitch rate command 122, and the gust-related input 144 can be an observed angle-of-attack. In this case, the difference block 148 determines the aircraft disturbance 150 as an angle-of-attack error between the observed angle-of-attack and the expected angle-of-attack as the aircraft disturbance, and the dead-band 152 limits output of the gust error 82 based on the angle-of-attack error.

Figure 7:
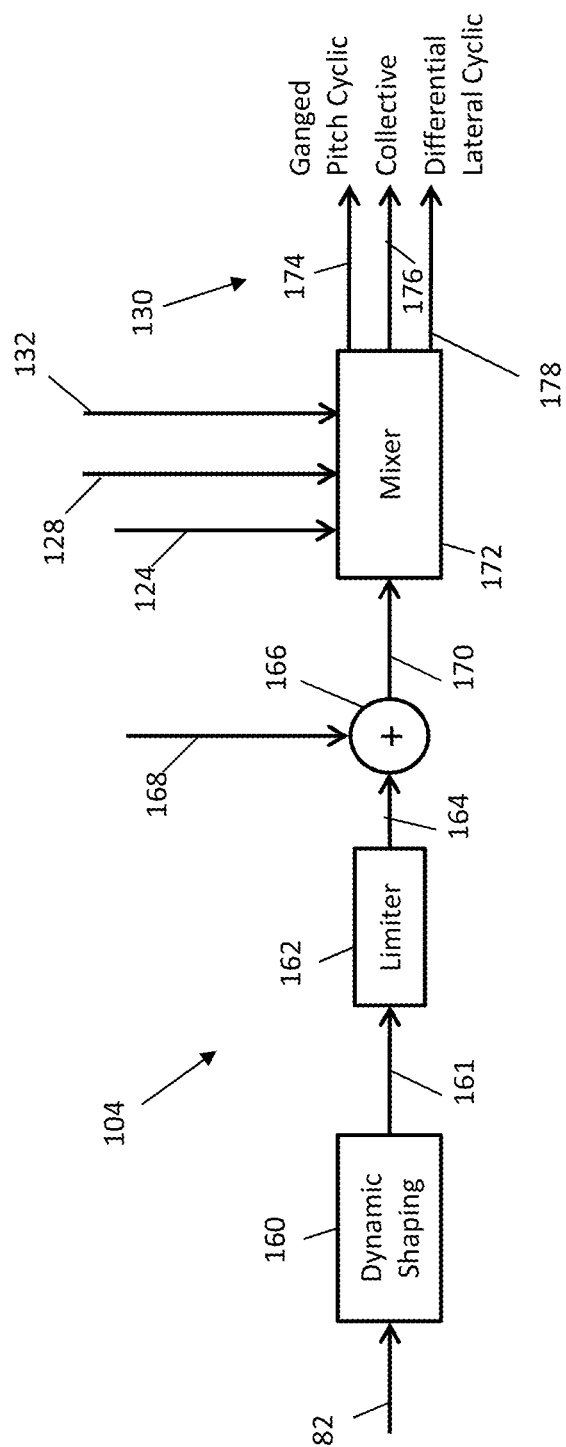
FIG. 7 is a schematic diagram of lift reducing gust alleviating control action according to an embodiment.

FIG. 7 is a schematic diagram of a portion of the main rotor command generator 104 according to an embodiment for lift reduction via collective control. In the example of FIG. 7, collective-based dynamic shaping 160 and a limiter 162 are applied to the gust error 82 to produce a shaped and limited gust error 164. The collective-based dynamic shaping 160 can occur before or after the limiter 162 is applied for additional lead in gust reduction and to bound collective movements. In FIG. 7, collective-based dynamic shaping 160 of the gust error 82 quickens (e.g., lead compensates) and scales the gust error 82 as a collective-control quickened gust error 161. The limiter 162 can limit the collective-control quickened gust error 161 as a collective-control limited quickened gust error 164 to restrict authority of the collective control response. A summing junction 166 combines a control input 168, such as a pilot collective command from the maneuvering inputs 74 of FIG. 5, with the collective-control limited quickened gust error 164 to produce an augmented pilot collective command 170 in this example.

A mixer 172 can output the augmented main rotor feed forward command 130 as an augmented command based on the augmented pilot collective command 170. The augmented main rotor feed forward command 130 may be a collective-based lift reduction that includes a combination of a ganged pitch cyclic command 174, a collective command 176, and a differential lateral cyclic command 178 (also referred to as a differential roll cyclic command) for the main rotor controller 50 to reduce the aircraft pitch response and a lift offset response to the augmented pilot collective command 170. The mixer 172 may also combine as a sum or weighted sum, the main rotor feed forward command 124, the main rotor pitch adjustment command 128, and/or the main rotor feedback adjustment command 132 to produce the augmented main rotor feed forward command 130. The mixing of the mixer 172 to the ganged pitch cyclic command 174 ensures that the collective reduction is not associated with an aircraft pitching moment, and thus is not invasive on the aircraft pitch response. The mixing to the differential lateral cyclic command 178 ensures that the collective reduction does not affect the lift offset characteristics of the main rotor system 12.

Figure 8:
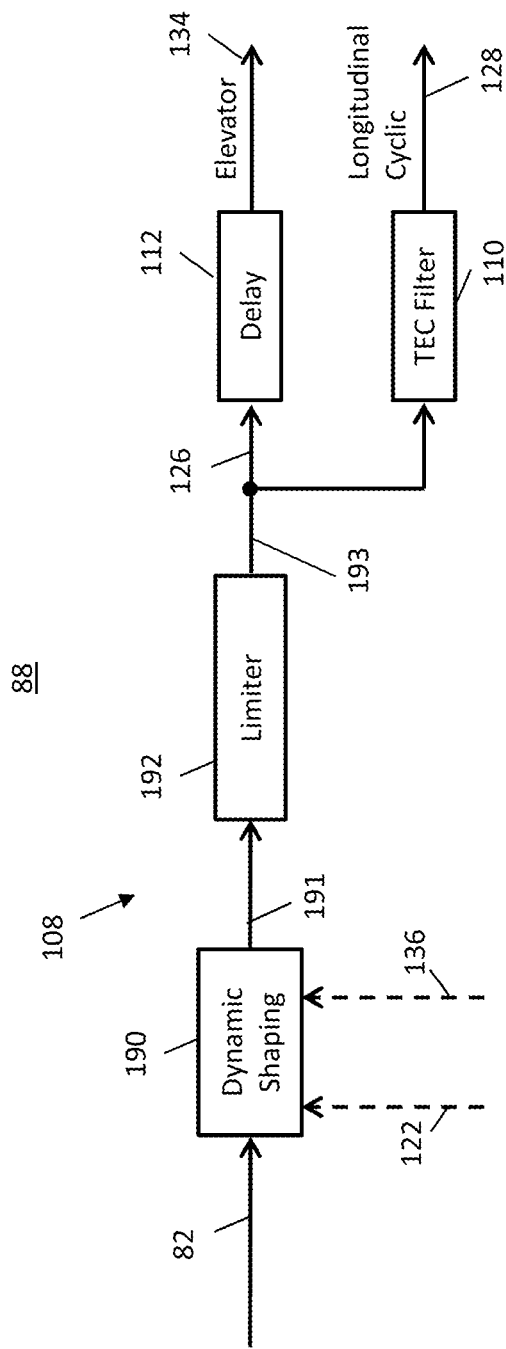
FIG. 8 is a schematic diagram of pitch moment reallocation gust alleviating control action according to an embodiment.

FIG. 8 is a schematic diagram of elevator control actions with pitch moment allocation according to an embodiment. The LAC filter 108 can include elevator-control dynamic shaping 190 and a limiter 192 that are configured to reduce loads on the main rotor system 12 and produce an elevator command 126 for the elevator controller 60 based on the gust error 82. The elevator-control dynamic shaping 190 of the gust error 82 can quicken (e.g., lead compensate) and scale the gust error 82 for elevator control as an elevator-control quickened gust error 191. Applying the limiter 192 to the elevator-control quickened gust error 191 results in an elevator-control limited quickened gust error 193 to restrict authority of the elevator control response. The elevator-control limited quickened gust error 193 is equivalent to the elevator command 126 which can be delayed by delay element 112 and transformed into an elevator command that is time shifted as augmented elevator command 134. The elevator command 126 can be used by the TEC filter 110 to produce the main rotor pitch adjustment command 128 as a main rotor cyclic command (e.g., a longitudinal cyclic command) based on the elevator command 126 in order to reduce the aircraft pitch response. The elevator-control dynamic shaping 190 may also be based on the pitch rate command 122 and/or the load related feedback signal 136.

The control action of an elevator pitch moment offset may shift the rotor pitching moment due to a gust from the main rotor system 12 on to the tail section 41 of the aircraft 10. In performing this control action, the main rotor cyclic can be deflected to counter the increased pitching moment due to the gust. An equal amount of elevator contribution may be used to balance the pitching moment so that the control action does not affect the pitch response of the aircraft 10. In one embodiment, a load factor is used as an input to determine the amount of elevator movement, and thus main rotor cyclic movement, required. Some elevator pitch moment offset can be desirable for both maneuvering conditions and gust conditions. The elevator deflection can be commanded without the pitch rate model 140 and dead-band 152 used for the collective control action. However, when there is additional elevator deflection that is desired for gust rejection, as compared to the maneuvering case, then the pitch rate model 140 and dead-band 152 can be used for this portion of the elevator deflection.

Technical effects include application of gust alleviating control to extend component life by reducing peak static and recurring fatigue loads in a coaxial rotary wing aircraft and providing increased tip clearance. Incorporating a gust alleviating control into an aircraft design may reduce aircraft weight by allowing for material reduction to withstand lower shaft bending loads in the main rotor system.

The terminology used herein is for the purpose of describing particular embodiments only and is not intended to be limiting. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A flight control system for a coaxial rotary wing aircraft comprising a main rotor system and an active elevator, the flight control system comprising:
a flight control computer that interfaces with the main rotor system and the active elevator, the flight control computer comprising processing circuitry configured to execute control logic comprising:
a gust detector that produces a gust error indicative of a wind gust encountered by the coaxial rotary wing aircraft; and
a gust alleviation control that reduces lift on the main rotor system with collective, based on the gust error, and mixes a collective command to a main rotor cyclic and a differential cyclic to reduce an aircraft pitch response and a lift-offset change, and further wherein the gust alleviation control reduces a main rotor pitching moment with the main rotor cyclic, based on the gust error, and mixes a main rotor cyclic command to the active elevator to reduce the aircraft pitch response.

2. The flight control system according to claim 1, wherein the gust detector comprises a pitch rate model that maps a pitch rate command into either an expected load factor or an expected angle-of-attack.

3. The flight control system according to claim 2, wherein the gust detector compares either the expected load factor or the expected angle-of-attack to a sensed load factor or an observed angle-of-attack to determine an aircraft disturbance.

4. The flight control system according to claim 3, wherein the gust detector applies a dead-band to the aircraft disturbance and produces the gust error.

5. The flight control system according to claim 1, wherein the gust alleviation control further comprises collective-based dynamic shaping of the gust error to quicken and scale the gust error as a collective-control quickened gust error.

6. The flight control system according to claim 5, wherein the gust alleviation control applies a limiter to the collective-control quickened gust error as a collective-control limited quickened gust error to restrict authority of the collective control response.

7. The flight control system according to claim 6, wherein the gust alleviation control sums the collective-control limited quickened gust error with a pilot collective command to produce an augmented pilot collective command.

8. The flight control system according to claim 7, wherein the gust alleviation control further comprises a mixer that outputs a ganged pitch cyclic command, the collective command, and a differential lateral cyclic command to reduce the aircraft pitch response and a lift offset response to the augmented pilot collective command.

9. The flight control system according to claim 1, wherein the gust alleviation control further comprises elevator-control dynamic shaping of the gust error to quicken and scale the gust error for elevator control as an elevator-control quickened gust error.

10. The flight control system according to claim 9, wherein the gust alleviation control applies a limiter to the elevator-control quickened gust error as an elevator-control limited quickened gust error to restrict authority of the elevator control response.

11. The flight control system according to claim 10, further comprising a delay element that transforms the elevator-control limited quickened gust error into an elevator command.

12. The flight control system according to claim 11, further comprising a transformed elevator command filter that produces the main rotor cyclic command based on the elevator command in order to reduce the aircraft pitch response.

13. A method of gust alleviation on a coaxial rotary wing aircraft comprising a main rotor system and an active elevator, the method comprising:
producing, by a gust detector, a gust error indicative of a wind gust encountered by the coaxial rotary wing aircraft;
reducing lift on the main rotor system with collective, by a gust alleviation control, based on the gust error;
mixing a collective command to a main rotor cyclic and a differential cyclic to reduce an aircraft pitch response and a lift-offset change;
reducing a main rotor pitching moment with the main rotor cyclic based on the gust error; and
mixing a main rotor cyclic command to the active elevator to reduce the aircraft pitch response.

14. The method according to claim 13, further comprising:
performing collective-based dynamic shaping of the gust error to quicken and scale the gust error as a collective-control quickened gust error;
limiting the collective-control quickened gust error as a collective-control limited quickened gust error to restrict authority of the collective control response;
summing the collective-control limited quickened gust error with a pilot collective command to produce an augmented pilot collective command; and
outputting a ganged pitch cyclic command, the collective command, and a differential lateral cyclic command to reduce the aircraft pitch response and a lift offset response to the augmented pilot collective command.

15. The method according to claim 13, further comprising:
performing elevator-control dynamic shaping of the gust error to quicken and scale the gust error for elevator control as an elevator-control quickened gust error;
limiting the elevator-control quickened gust error as an elevator-control limited quickened gust error to restrict authority of the elevator control response;
delaying the elevator-control limited quickened gust error to transform the elevator-control limited quickened gust error into an elevator command; and
applying a transformed elevator command filter to produce the main rotor cyclic command based on the elevator command in order to reduce the aircraft pitch response.

\* \* \* \* \*